United States Patent [19]

Jakab

[11] Patent Number: 5,274,704
[45] Date of Patent: Dec. 28, 1993

[54] TRANSFORMER TELEPHONE LINE INTERFACE CIRCUIT

[75] Inventor: Gyula Jakab, Nepean, Canada

[73] Assignee: Northern Telecom Limited, Montreal, Canada

[21] Appl. No.: 604,447

[22] Filed: Oct. 29, 1990

Related U.S. Application Data

[63] Continuation-in-part of Ser. No. 299,111, Jan. 19, 1989, Pat. No. 4,982,426.

[51] Int. Cl.⁵ .............................. H04B 1/58; H04B 3/03
[52] U.S. Cl. ........................................ 379/403; 379/402; 379/399
[58] Field of Search .............. 379/402, 403, 405, 391, 379/392, 399, 345; 370/32, 32.1

[56] References Cited

U.S. PATENT DOCUMENTS

| | | | |
|---|---|---|---|
| 2,947,952 | 8/1960 | Hughes | 379/403 |
| 4,595,802 | 1/1986 | Wittman | 370/32.1 |
| 4,881,262 | 11/1989 | Meschkat et al. | 379/402 |

Primary Examiner—James L. Dwyer
Assistant Examiner—Ahmad F. Matar
Attorney, Agent, or Firm—Foley & Lardner

[57] ABSTRACT

A telephone line interface circuit includes a transformer provided with first, second and third windings. The first winding is connected across the tip and ring wires of the telephone line and the second winding is connected to the output of an amplifier which has an input connected to a receive line. In a first case where the input to which the receive line is connected is the inverting input, a first resistor is connected in series between the receive line and the inverting input. The third winding is connected in series with a second resistor to form a feedback loop which is connected to the inverting input of the amplifier. The transfer function of the interface circuit is dependent on the ratio of the resistances of the first and second resistors and the turns ratio of the first winding to the third winding but is substantially independent of transformer parasitics. In the case where the receive line is connected to the non-inverting input, the first and second resistors are not required and the transfer function is dependent only on the turns ratio.

24 Claims, 6 Drawing Sheets

TRANSFORMER TELEPHONE LINE INTERFACE CIRCUIT

CROSS-REFERENCE TO RELATED APPLICATION

The present application is a continuation-in-part of copending application Ser. No. 299,111 filed on Jan. 19, 1989, now U.S. Pat. No. 4,982,426, issued Jan. 1, 1991.

BACKGROUND OF THE INVENTION

This invention relates to telecommunications line interface circuits.

In line interface circuits for two-wire and four-wire telecommunications lines, e.g. telephone lines, it is common to provide a transformer in view of its desirable common mode signal rejection and ground isolation characteristics. In telephone applications such lines usually must be able to conduct a substantial direct current, typically up to about 60 mA, which also flows through a primary winding of the transformer. In addition, a line terminating impedance, typically of 600 to 900 ohms, is reflected from the secondary to the primary winding of the transformer to match the impedance of the line.

To achieve a desired low cut-off frequency of 50 Hz or less, the primary winding of such a transformer must provide an inductance of several Henries, necessitating a large number of turns of the primary winding even using a ferrite core transformer. To avoid magnetic flux saturation of the transformer core as a result of the direct current flowing through this large number of turns, the transformer must be physically large, and consequently expensive. The transformer size also creates a significant problem in trying to provide compact arrangements of many line interface circuits.

U.S. Pat. No. 4,982,426 discloses a circuit arrangement for a line interface circuit in which the transformer may be reduced in size without adversely affecting the performance of the circuit. However, in common with prior art circuit arrangements, the performance of the circuit at low frequencies is limited by the transformer parasitics, namely its magnetizing inductance.

SUMMARY OF THE INVENTION

It is an object of the present invention to provide a line interface circuit which can operate at low frequencies largely independently of the transformer parasitics.

This object is achieved by an interface circuit of a two wire telecommunications line having a ring wire and a tip wire or for a four wire telecommunications line having first ring and tip wires defining a receive side and second ring and tip wires defining a transmit side, the interface circuit comprising a transformer having first, second and third windings, the first winding being arranged for connection across the ring and tip wires of the two wire telecommunications line or across the first ring and tip wires of the four wire telecommunications line, the second winding having one end connected to a reference potential and another end connected to the output of an operational amplifier which has an input connected to a receive line, the third winding having one end connected to a reference potential and another end connected in a feedback loop to an inverting input of the amplifier, whereby the transfer function of the interface circuit is dependent on the turns ratio of the first winding to the third winding but substantially independent of transformer parasitics.

In a preferred arrangement in which the amplifier input to which the receive line is connected is the inverting input, a first resistor is connected in series between the receive line and the inverting input and a second resistor is connected in the feedback loop in series with the third winding, the transfer function of the interface circuit additionally being dependent on the ratio of the resistances of the first and second resistors.

The novel circuit arrangement may be combined with that disclosed in U.S. Pat. No. 4,982,426 to provide a line interface circuit in which the transformer can be reduced in size and the circuit can be operated independently of transformer parasitics.

DESCRIPTION OF THE PREFERRED EMBODIMENTS

Figure 1:
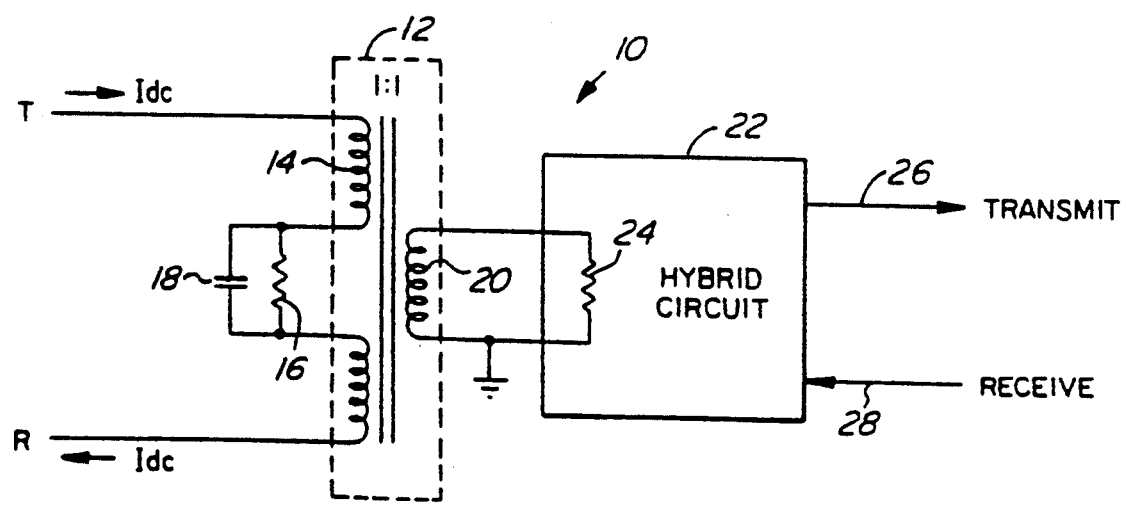
FIG. 1 schematically illustrates a known form of two-wire telecommunications line interface circuit.

Referring to FIG. 1, there is illustrated a known form of interface circuit 10 for a two-wire telephone line having a floating direct current path. The two-wire line comprises tip and ring wires T and R respectively carrying a direct current Idc which is typically in the range of 18 to 60 mA, and has an a.c. impedance of 600 to 900 ohms which is matched by the line interface circuit. The line interface circuit 10 comprises transformer 12 having a split primary winding 14, with two equal halves which are coupled between the tip and ring wires T and R of the line and are coupled together via a resistor 16 for passing the current Idc, and an a.c. bypass capacitor 18, and a secondary winding 20, with a 1:1 turns ratio between the primary winding 14 and the secondary winding 20. The circuit 10 further comprises a hybrid circuit 22, having a terminating impedance 24 which is connected to the secondary winding 20, for coupling signals to a transmit line 26 and from a receive line 28. The terminating impedance 24 of the hybrid circuit 22 is reflected across the primary winding 14 of the transformer 12 to match the line impedance.

For acceptable performance of such a line interface circuit with telephone signals, the circuit must provide a −3 dB lower cut-off frequency f of 50 Hz or less. This necessitates that the primary winding 14 have an inductance of at least R/(2πf), where R is the line impedance. For R=900 ohms and f=50 Hz, this primary winding inductance must be at least 2.86 Henries. In order to provide such an inductance, the primary winding 14 must have a large number of turns. In order to avoid saturation of the core of the transformer 12 by the current Idc flowing through this large number of turns, the transformer 12 must be physically large and relatively expensive; typically the transformer must have dimensions of the order of 4 cm×3.5 cm×2.5 cm and a volume of the order of 35 cm³. Mounting such transformers on printed circuit boards, which are arranged side by side in parallel as is common in telecommunications equipment, necessitates a relatively large spacing between circuit boards, and hence leads to undesirably large equipment sizes.

Figure 2:
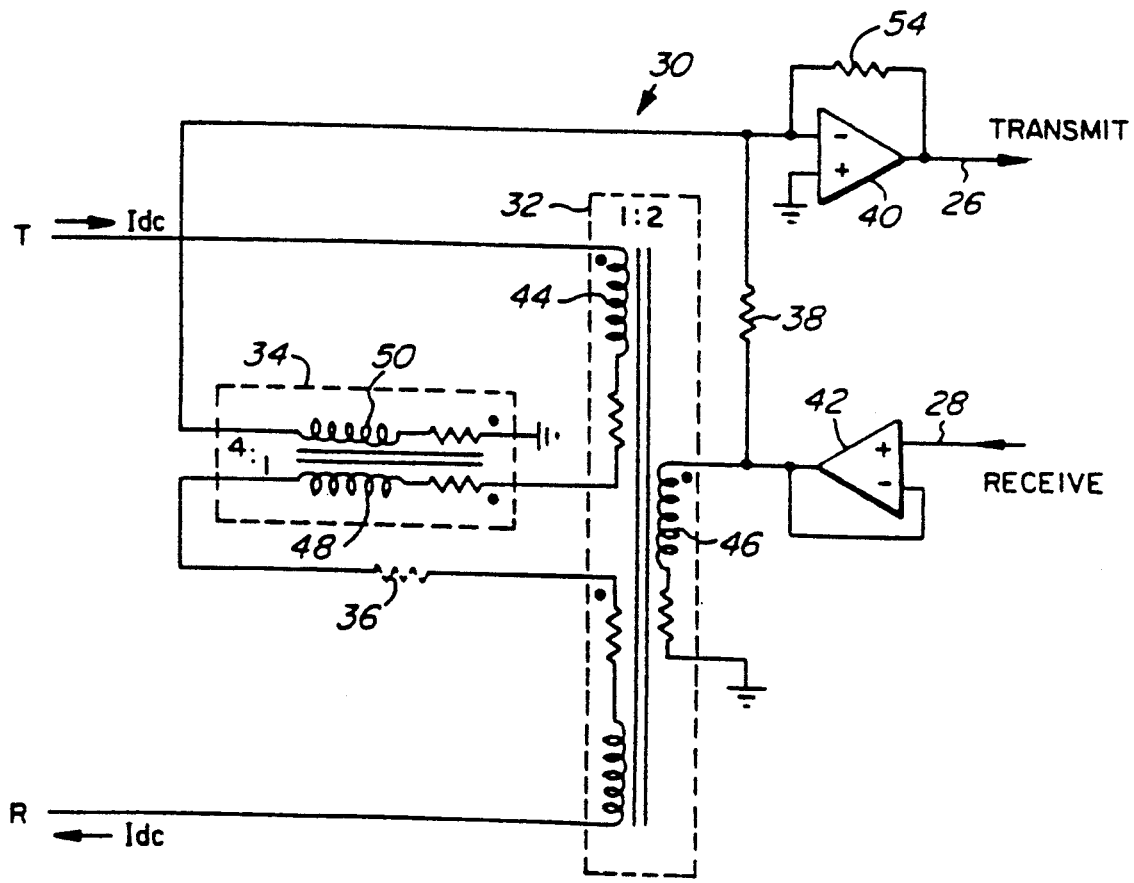
FIG. 2 schematically illustrates a basic form of a two-wire telecommunications line interface circuit in accordance with an embodiment of the invention of U.S. Pat. No. 4,982,426.

FIG. 2 illustrates, using references similar to those of FIG. 1 where applicable, a generally basic form of a two-wire line interface circuit 30 in accordance with this invention. As in FIG. 1, the two-wire line in FIG. 2 comprises tip and ring wires T and R balanced with respect to ground and which may carry a loop current Idc in the range of 18 to 60 mA. The line interface circuit 30 comprises two transformers 32 and 34, an optional resistor 36, a balance impedance represented by a resistor 38 but which may also include complex impedance components such as capacitors, and transmit and receive signal amplifiers 40 and 42 respectively, the former having a feedback resistor 54. These components and their interconnections are further described below. The transformers 32 and 34 are ferrite core transformers, types RM8 and RM4 respectively, as described further below, and in the drawings dots adjacent the transformer windings indicate the senses of the windings in conventional manner.

In the line interface circuit 30 of FIG. 2 the transformer 32, like the transformer 12 in the circuit of FIG. 1, has a primary winding 44 which is split into two equal halves, and a secondary winding 46. Each winding has not only an inductive component but also a resistive component, these components being represented schematically in FIG. 2 by an inductor and resistor connected in series. Similarly, the transformer 34 has a primary winding 48 and a secondary winding 50 each having an inductive component and a resistive component as represented schematically in FIG. 2.

The two halves of the primary winding 44 of the transformer 32 are bifilar wound from insulated resistance wire, and for example comprise 2 by 500 turns of 40 AWG type MWS-60 alloy resistance wire, providing each half of the primary winding with a resistance of 335 ohms, for a total primary winding resistance of 670 ohms, and a primary winding inductance of 0.25 H (Henry). The secondary winding 46 of the transformer 32 can comprise 2,000 turns of 40 AWG copper wire, providing an inductance of 1 H, a resistance of 310 ohms, and a primary:secondary turns ratio for the transformer 32 of 1:2.

The amplifier 42 is a differential amplifier acting as a unity-gain buffer for coupling a signal received via the receive line 28, connected to a non-inverting input of the amplifier 42, to the secondary winding 46 which is connected between an output of the amplifier 42 and ground. As the amplifier 42 has a low output impedance, its output constitutes a virtual ground for a.c. signals, whereby the secondary winding 46 operates in a short-circuited mode in which its winding resistance, multiplied by the square of the transformer 32 turns ratio from the secondary to the primary, is reflected at the primary winding 44 of this transformer. Thus there is an impedance 310*(½)²=77.5 ohms reflected at the primary winding 44 from the secondary winding 46. This forms with the primary winding inductance of 0.25 H a −3 dB lower cut-off frequency of 77.5/(2*π*0.25)=49.3 Hz.

The primary winding 44 of the transformer 32 is connected between the wires T and R, as for the transformer 12 of FIG. 1. However, as the secondary winding 46 is terminated by the low output impedance of the amplifier 42, it can not be used for producing a signal voltage for the transmit line 26 as in FIG. 1. In FIG. 2, therefore, the two halves of the primary winding 44 are coupled together via the primary winding 48 of the transformer 34 in series with the optional resistor 36. The secondary winding 50 of the transformer 34 is connected between ground and an inverting input of the transmit amplifier 40, which is a differential amplifier having a non-inverting input which is grounded and an output which is connected to the transmit line 26. The feedback resistor 54 is connected between the output and the inverting input of the amplifier 40. The balance impedance 38 is connected between the output of the amplifier 42 and the inverting input of the amplifier 40 to provide for transhybrid cancellation of signals at the signal summing node constituted by the inverting input of the amplifier 40.

The primary winding 48 of the transformer 34 comprises 112 turns of 40 AWG copper wire providing a resistance of 35.5 ohms and an inductance of 2 mH, and the secondary winding 50 comprises 448 turns of 40 AWG type MWS-60 alloy resistance wire providing a resistance of 30 ohms and an inductance of 32 mH, with a primary:secondary turns ratio of 1:4. The secondary winding 50 is terminated in a low impedance by the virtual ground at the inverting input of the amplifier 40, and consequently the secondary winding 50 provides at the primary winding a reflected impedance of 30*(¼)²=1.875 ohms.

The optional resistor 36 provides a resistance which is selected to pad the total impedance presented to the line wires T and R to match the impedance of the line, in this case 900 ohms. This 900 ohm impedance is made up by the following contributions as discussed above:

| | |
|---|---|
| Resistance of primary winding 44: | 670 |
| Impedance reflected from secondary winding 46: | 77.5 |
| Resistance of primary winding 48: | 35.5 |
| Impedance reflected from secondary winding 50: | 1.875 |
| Padding resistance 36: | 115.125 |
| Total: | 900 ohms |

Obviously, the impedances provided by the transformer windings could be increased to eliminate the need for the padding resistance 36, if desired.

In the line interface circuit 30 of FIG. 2, the loop current Idc of up to 60 mA flows through the primary winding 44 of the transformer 32 and through the primary winding 48 of the transformer 34. Because the inductance of the primary winding 44 of the transformer 34 is very low, this current Idc can be accommodated by the small RM4 core of this transformer without saturation. The RM8 core of the transformer 32 is also able to accommodate this current Idc flowing through the primary winding 44, without saturation, because the magnetic flux generated by this current is reduced, relative to the flux in the transformer 12 of FIG. 1, due to the relatively reduced number of turns of this primary winding.

Viewed alternatively, it can be seen that in the line interface circuit 30 of FIG. 2 the line terminating impedance is provided to a large extent by the resistance of the primary winding 44, and to only a small extent by impedance reflected from the secondary winding 46, in contrast to the full 900 ohm terminating impedance 24 in FIG. 1. Consequently, for the same lower cut-off frequency of about 50 Hz, the primary winding 44 can have a much lower inductance than the winding 14 of FIG. 1, and hence can have fewer turns, creating proportionally a much smaller magnetic flux for the same loop current Idc and consequently allowing a much smaller transformer to be used without saturation.

With the characteristics described above, the transformer 32 can have a size of about 2 cm × 2 cm × 1.78 cm with a volume of about 7.1 cm$^3$, and the transformer 34 can have a size of about 1 cm × 1 cm × 1 cm with a volume of about 1 cm$^3$, giving a total volume of 8.1 cm$^3$ or less than one quarter the volume of the transformer 12 of FIG. 1. In particular, such transformers are not only smaller and less expensive than the transformer 12 of FIG. 1, but also enable adjacent printed circuit boards on which the transformers are mounted to be spaced apart by significantly reduced distances, resulting in much more compact equipment than is possible with the line interface circuits of FIG. 1.

Figure 3:
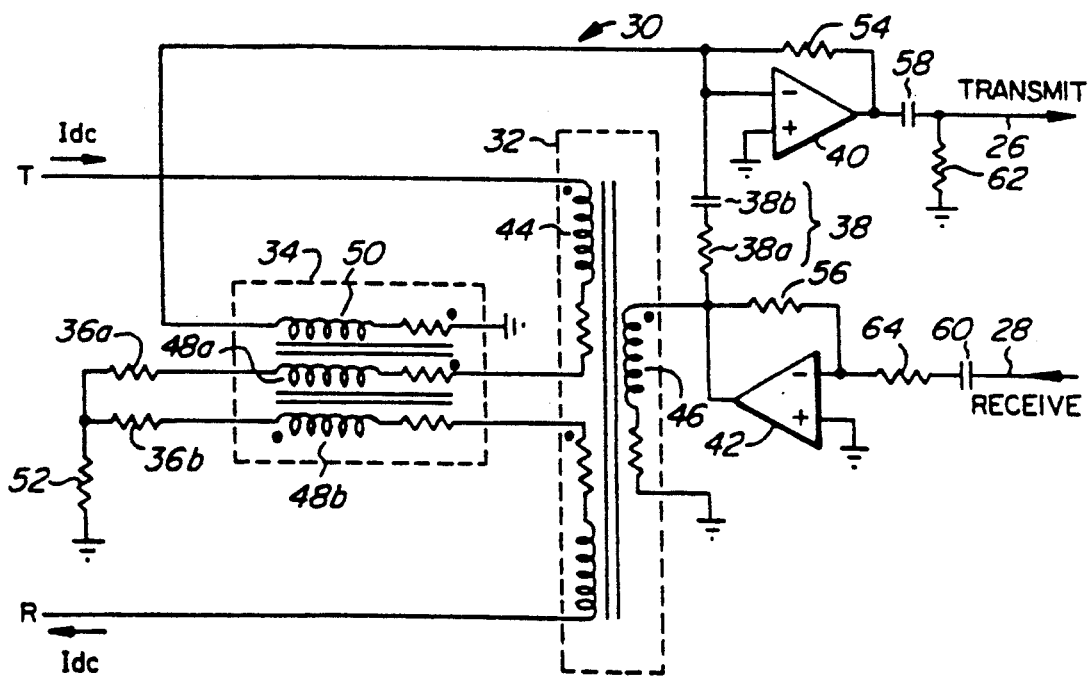
FIG. 3 schematically illustrates a preferred form of the two-wire telecommunications line interface circuit of FIG. 2.

FIG. 3 illustrates a preferred form of the line interface circuit 30 of FIG. 1; similar references are used to denote similar components, and only the differences from FIG. 2 are described below.

In the circuit 30 of FIG. 3, the primary winding 48 of the transformer 34 is split into two equal halves 48a and 48b, and the padding resistor 36 is similarly split into two equal resistors 36a and 36b, which are connected in series between the two halves of the primary winding 44 of the transformer 32 to provide a fully balanced arrangement. A central junction between the series resistors 36a and 36b is grounded via a relatively high impedance resistor 52. The balance impedance 38 of FIG. 2 is constituted in FIG. 3 by a series-connected resistor 38a and capacitor 38b. FIG. 3 also illustrates feedback resistors 54 and 56 for determining the gain of the amplifiers 40 and 42 respectively, and coupling capacitors 58, 60 and resistors 62, 64 associated with the transmit and receive lines 26 and 28.

It should be appreciated that the order Of series connections of the components 44, 48a, and 36a and 44, 48b, and 36b can be changed arbitrarily, for example to be as illustrated in the line interface circuit of FIG. 4 as described below. In addition, it should be appreciated that instead of completing a loop for the current Idc as described and illustrated, the resistors 36a and 36b could instead be connected to ground and −48 volt terminals of a d.c. supply for supplying loop current to the line wires T and R, again as described below for the circuit of FIG. 4.

In the line interface circuits of FIGS. 2 and 3, the line is terminated with a d.c. resistance which is of generally similar magnitude to the a.c. impedance with which the line is terminated. However, in Lertain situations it is desirable to terminate the line with a relatively high a.c. impedance, for example 900 ohms, and with a significantly lower d.c. resistance, for example 440 ohms or less. FIG. 4 illustrates a modified form of line interface circuit which facilitates this. Again, similar references are used in FIG. 4 to denote components similar to those of FIGS. 2 and 3, and only the modifications are described below.

Figure 4:
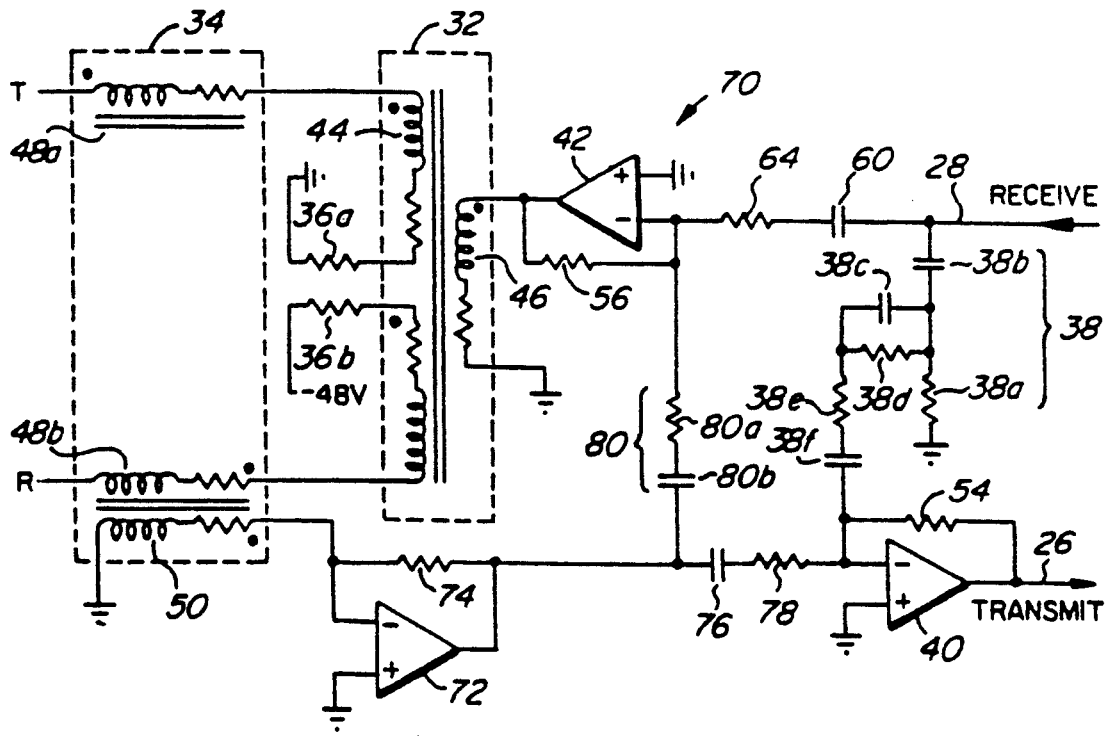
FIG. 4 schematically illustrates a two-wire telecommunications line interface circuit in accordance with another embodiment of the invention of U.S. Pat. No. 4,982,426.

In the line interface circuit, referenced 70, of FIG. 4, d.c. loop current flows between a −48 volt source and ground via the resistor 36b, one half of the primary winding 44 of the transformer 32, the winding half 48b of the primary winding of the transformer 34, the ring wire R and the tip wire T of the two-wire line, the winding half 48a, the other half of the primary winding 44, and the resistor 36a. The two halves of the winding 44 may each have a resistance of 39.6 ohms, the winding halves 48a and 48b may each have a resistance of 6 ohms, and the resistors 35a and 35b may each have a resistance of 174.5 ohms to provide a total resistance of 440 ohms for d.c. on the line. The resistors 36a and 36b may comprise thick film and PTC resistors, electrically connected in series and thermally coupled with one another, as described in Jakab U.S. Pat. No. 4,467,310 issued Aug. 21, 1984 and entitled "Telephone Subscriber Line Battery Feed Resistor Arrangements".

The receive signal path from the line 28 to the secondary winding 46 of the transformer 32 in the line interface circuit 30 is substantially the same as for the circuit 30 of FIG. 3. For the transmit signal, the amplifier 40, with its feedback resistor 54, has its output coupled to the transmit line 26, its non-inverting input grounded, and its inverting input acting as a summing node for transhybrid signal cancellation in a similar manner to that of FIG. 3. The balance impedance 38 is in this case constituted by resistors and capacitors 38a to 38f coupled between the receive line 28 and this summing node.

In the line interface circuit 70 of FIG. 4, the secondary winding 50 of the transformer 34 is connected between ground and the inverting input of a differential amplifier 72, whose non-inverting input is grounded (so that the inverting input is a virtual ground) and whose output is coupled via a gain-determining feedback resistor 74 to the inverting input and via a coupling capacitor 76 and resistor 78 to the summing node, referred to above, constituted by the inverting input of the amplifier 40. The output of the amplifier 72 is also coupled, via an a.c. impedance controlling impedance 80, constituted in FIG. 4 by a resistor 80a and a capacitor 80b in series, to the inverting input of the amplifier 40 which also acts as a summing node. The impedance 80 serves as described below to control the a.c. impedance presented by the line interface circuit 70 to the line comprising the wires T and R, so that it can be significantly different from the d.c. resistance presented to the line by the circuit 70.

More particularly, the amplifier 72 produces at its output a voltage which is dependent upon the (alternating) current flowing via the line wires T and R. This voltage, as well as being coupled via the amplifier 40 to the transmit line 26 to constitute the transmit signal, is applied via the impedance 80 and the amplifier 42 as a feedback signal to the transformer 32, whereby it increases the a.c. impedance presented to the line by this transformer in accordance with the magnitude and characteristics of the impedance 80. The impedance 80, which can be a simple complex impedance formed by the resistor 80a and capacitor 80b as shown, or a more complicated form of complex impedance, or simply a resistance, thus serves to control the a.c. impedance of the line interface circuit 70.

Figure 5:
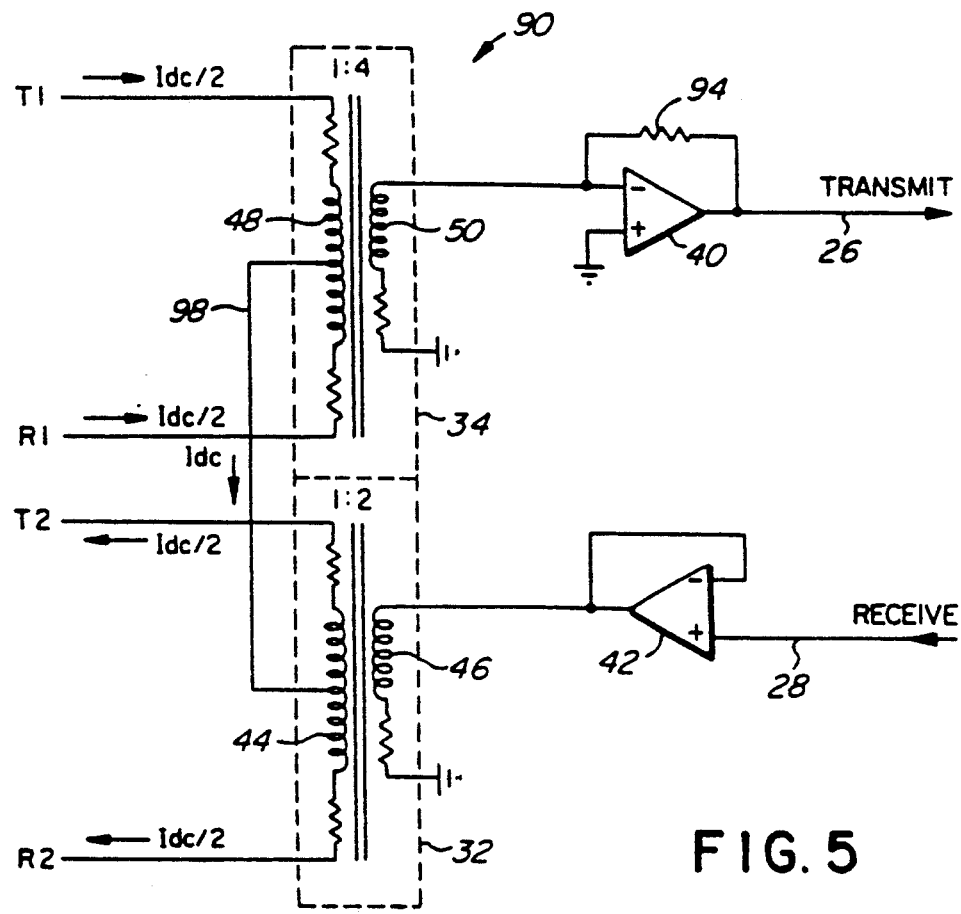
FIG. 5 schematically illustrates a four-wire telecommunications line interface circuit in accordance with a further embodiment of the invention of application Ser. No. 299,111.

Although the above described embodiments of the invention relate to two-wire line interface circuits, the invention can also be applied to a line interface circuit for a four-wire line, for example as illustrated for a line interface circuit 90 in FIG. 5.

Referring to FIG. 5, the line interface circuit 90 uses transformers 32 and 34 as in FIGS. 2 and 3 as described above, together with amplifiers 40 and 42, for coupling signals from a first pair of wires T1, R1 to the transmit line 26 and from the receive line 28 to a second pair of wires T2, R2, the two pairs of wires constituting the four-wire line. Each of the four wires carries a loop current Idc/2 as shown, a total loop current Idc flowing towards the line interface circuit via the wires T1, R1, a connecting line 98 from a center tap of the primary winding 44 of the transformer 32 to a center tap of the primary winding 48 of the transformer 34, and away from the line interface circuit 90 via the wires T2, R2.

As in the case of FIG. 2 as described above, in the line interface circuit 90 of FIG. 5 the secondary 46 of the transformer 32 is connected between ground and the output of the amplifier 42, and hence is operated in a short circuited mode whereby its resistance is reflected at the primary winding 44 of this transformer, the resistance of which itself contributes as in FIG. 2 to the impedance presented by the line interface circuit 90 to the wires T2, R2. In the transmit direction, a signal on the wires T2, R2 is coupled via the transformer 34 to the inverting input of the amplifier 40, the output of the amplifier 40 being connected to the transmit line 26 and being coupled via a feedback resistor 94 to the inverting input of the amplifier 40.

It should be appreciated that in the line interface circuit 90, in addition to a size reduction of the transformers for reasons similar to those described above for the two-wire line interface circuits, the core size of the transformers 32 and 34 can be further reduced because the currents Idc/2 flow in opposite directions in the two halves of the primary windings 44 and 48 of these transformers, so that the magnetic flux due to these direct currents cancels in each transformer.

Although the circuits of FIGS. 2-5 allow the transformer 32 to be kept physically small and provide good performance for most applications, their performance at low frequencies is limited by the magnetizing inductance of the transformer.

Figure 6:
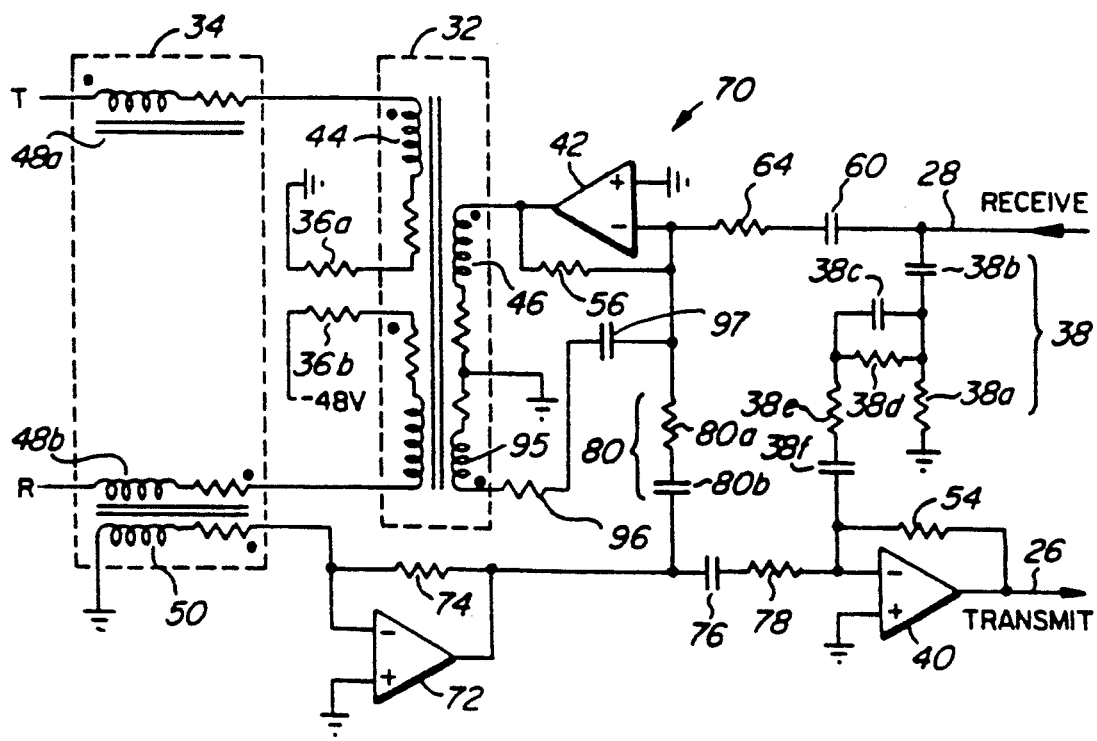
FIG. 6 is a circuit diagram similar to that of FIG. 4 but illustrating the addition of another secondary winding for the elimination of the adverse effect of transformer parasitics in accordance with the present invention.

FIG. 6 shows a modification to the circuitry of FIG. 4 which effectively eliminates the effect of the magnetizing inductance. This involves connecting between the grounded end of the secondary winding 46 and the inverting input of operational amplifier 42 a feedback loop including a series connected additional secondary winding 95 and a resistor 96. The additional winding 95, like the other transformer windings, has a resistive component and an inductive component. A blocking capacitor 97 is also connected in the feedback loop to block D.C.

The way in which winding 95 and resistor 96 use a feedback voltage to eliminate the effect of the magnetizing inductance of transformer 32 will be explained with reference to FIG. 11 but first a brief discussion of transformer parasitics will be given with particular reference to FIG. 10.

Figure 10:
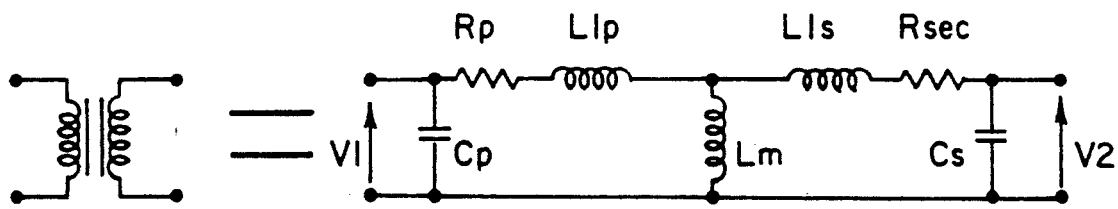
FIG. 10 is an equivalent circuit of a transformer.

FIG. 10 shows an equivalent circuit of a transformer such as transformer 32. The circuit components represent the following transformer parameters:

Cp = primary winding capacitance.
Cs = secondary winding capacitance.
Rp = primary winding resistance.
Rsec = secondary winding resistance.
Llp = primary leakage inductance.
Lls = secondary leakage inductance.
Lm = magnetizing inductance.

The transfer function of the transformer at low frequencies (f < 200 Hz where Cp, Cs, Llp, Lls can be neglected) is:

$$V1(s)/V2(s) = \frac{1}{1 + Rsec/sLm}$$

("s" is the complex frequency)

From this can be seen that the transfer function has pole at $$s = -Rsec/Lm$$

The transformer is usable down to this frequency only.

Figure 11:
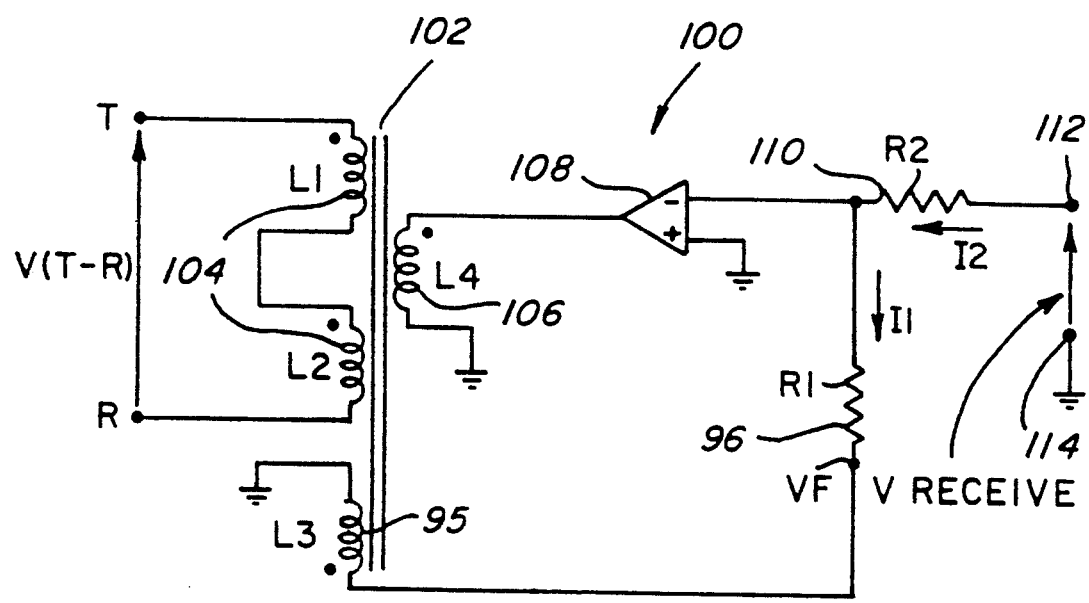
FIG. 11 schematically illustrates how the addition of the secondary winding in FIGS. 6 to 9 serves to eliminate transformer parasitics.

Referring now to FIG. 11, this shows schematically an interface circuit 100 connected to tip and ring wires T and R. Only the RECEIVE portion of the interface circuit is shown as the TRANSMIT portion, which could be essentially identical to the TRANSMIT portions of FIGS. 2, 3 or 4 for example, does not suffer from the transformer parasitics.

The interface circuit 100 comprises a transformer 102 which has a primary winding 104 split into two halves and a secondary winding 106. The winding 95 of FIG. 6 is shown in FIG. 11 as an additional secondary winding and the resistor 96 of FIG. 6 is shown in FIG. 11 connected to the inverting input of an operational amplifier 108 the output of which is connected to the dotted end of winding 106. The non-dotted ends of windings 106 and 95 are grounded as is the non-inverting input of amplifier 108. A resistor 110, corresponding to resistor 64 of FIG. 6, is connected between one terminal 112 of the RECEIVE input and the inverting input of amplifier 108. The other terminal 114 of the RECEIVE input is grounded. The resistance components of windings 104, 106 and 95 are omitted from FIG. 11 for clarity.

The turns ratio of transformer 102 is 1:2. More specifically primary winding 104 has the same number of turns as each secondary winding 95 and 106. Although it is important that the turns ratio of windings 104 and 95 be known and in this case is 1:1, the turns ratio of winding 104 to winding 106 is not critical.

Assuming the voltage across T-R is V(T−R), then, since the turns ratio between windings 104 and 95 is one and resistor 96 is a high value resistor representing negligible load, VF = V(T−R) where VF is the feedback voltage derived on winding 95.

The inverting input of amplifier is at ground potential. (from op-amp basics, the non-inverting input is connected to ground) Then $$I1 = I2$$

where I1 is the current through resistor 96 and I2 is the current through resistor 110

$$I1 = VF/R1$$

where R1 is the resistance of resistor 96 and $$I2 = Vreceive/R2$$

where R2 is the resistance of resistor 110
From this VF=Vreceive(R1/R2)
Since VF=V(T−R), the transfer function of the interface circuit is:

$$V(T-R)/Vreceive = R1/R2$$

Thus, it can be seen that the transfer function is dependent only on the ratio of R1/R2 and is not dependent on transformer parasitics.

As applied to the circuit of FIG. 6 the amplifier 42 corresponds to amplifier 108 of FIG. 11, winding 44 corresponds to winding 104 of FIG. 11 and winding 46 corresponds to winding 106 of FIG. 11. The feedback resistor 56 of FIG. 6 does not affect significantly the operation of the circuit described in the reference to FIG. 11 providing the resistance of resistor 56 is significantly larger than (e.g. 10 times) that of resistor 96. Moreover blocking capacitor 97 does not influence the value of the transfer function.

The improvement in low frequency performance achieved by the feedback circuit of winding 95 and resistor 96 does not diminish the other beneficial effects achieved by the circuitry of FIG. 6, particularly the reduction in physical size of the transformer 32.

Figure 8:
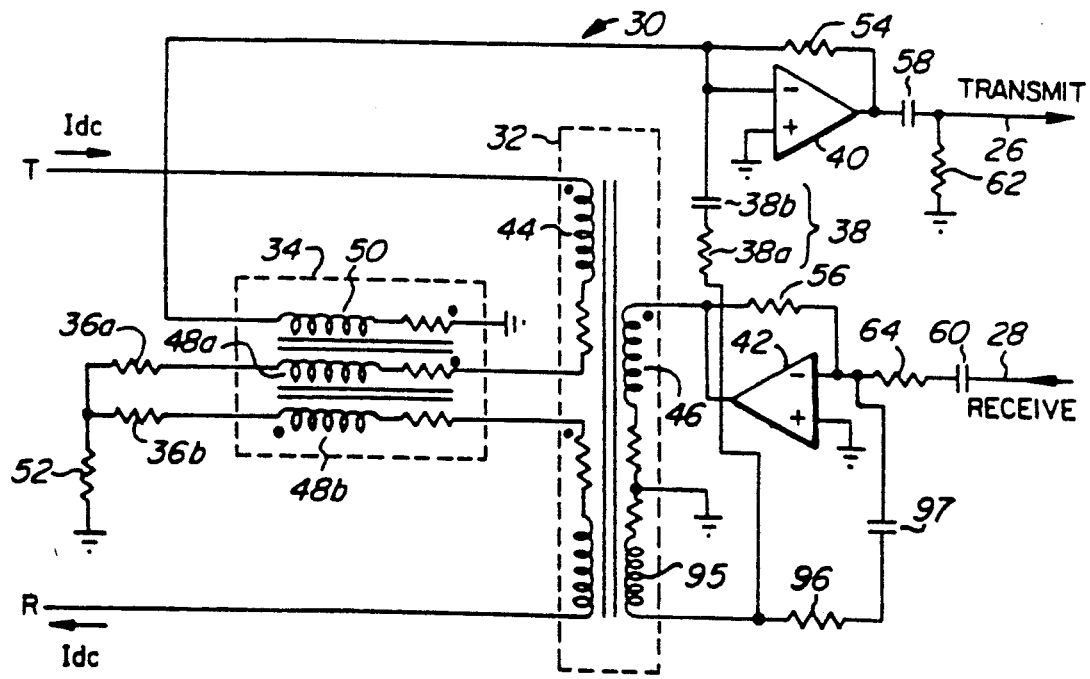

FIG. 8 has a feedback loop comprising components 95, 96 and 97 constructed and arranged in essentially identical fashion to that of FIG. 6 and its operation is as described with reference to FIGS. 6 and 11. It is noted that FIG. 8 which is based on FIG. 2 differs from that Figure in that the balance resistor 38a is connected to the junction of winding 95 and resistor 96 instead of the output of amplifier 42.

Typical values for the components forming the feedback loop are 30K ohms for resistor 96 and 0.47 μF for capacitor 97. Although a turns ratio of 1:1 has been assumed for the explanation of FIG. 11, from a practical standpoint a turns ratio of around 10:1 for winding 104 (44) to 95 is preferred as this keeps winding 95 physically small. Theoretically any turns ratio can be used. The only difference in the transfer function is that the ratio R1/R2 is multiplied by the turns ratio. For a 10:1 turns ratio and winding 104 comprising 2 by 500 turns of 40 AWG type MWS alloy resistance wire, the winding 95 would comprise typically 100 turns of 40 AWG copper wire providing an inductance of 2.5 mH and resistance of 15 ohms.

Figure 7:
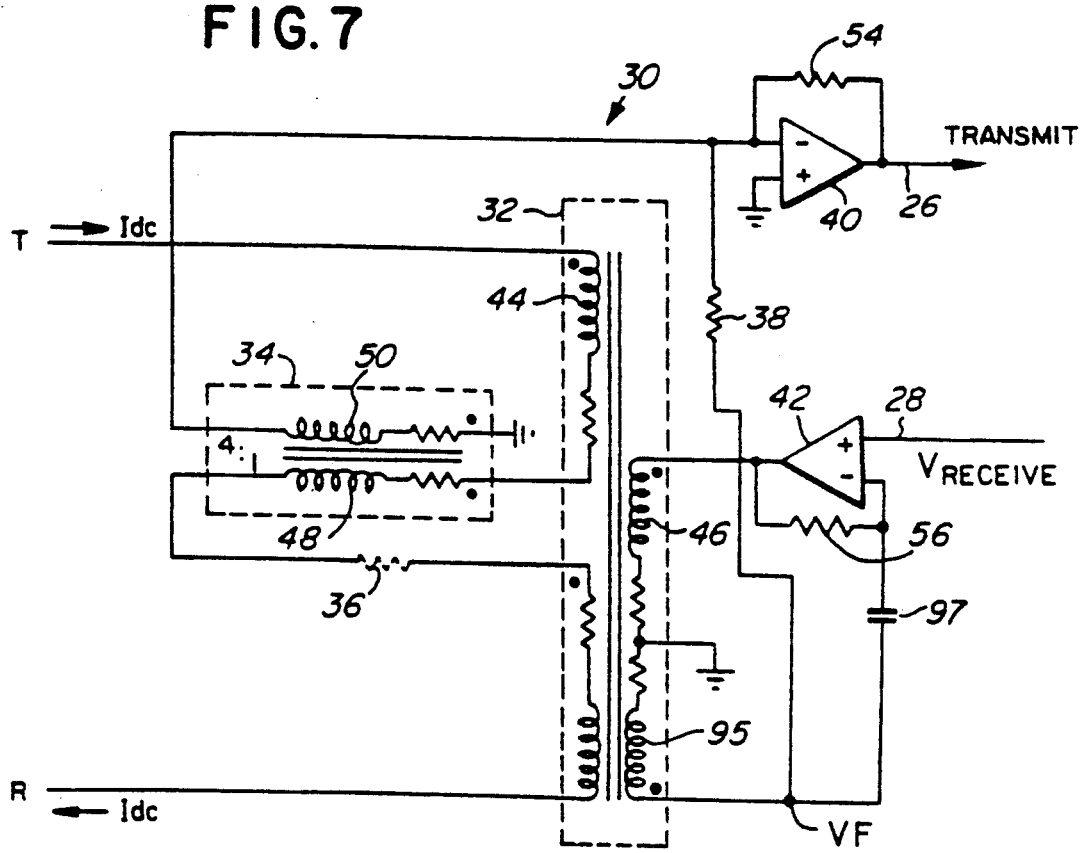
FIGS. 7, 8 and 9 are circuit diagrams similar to FIGS. 2, 3 and 5, respectively, in which another secondary winding has been added in a manner similar to FIG. 6.
Figure 9:
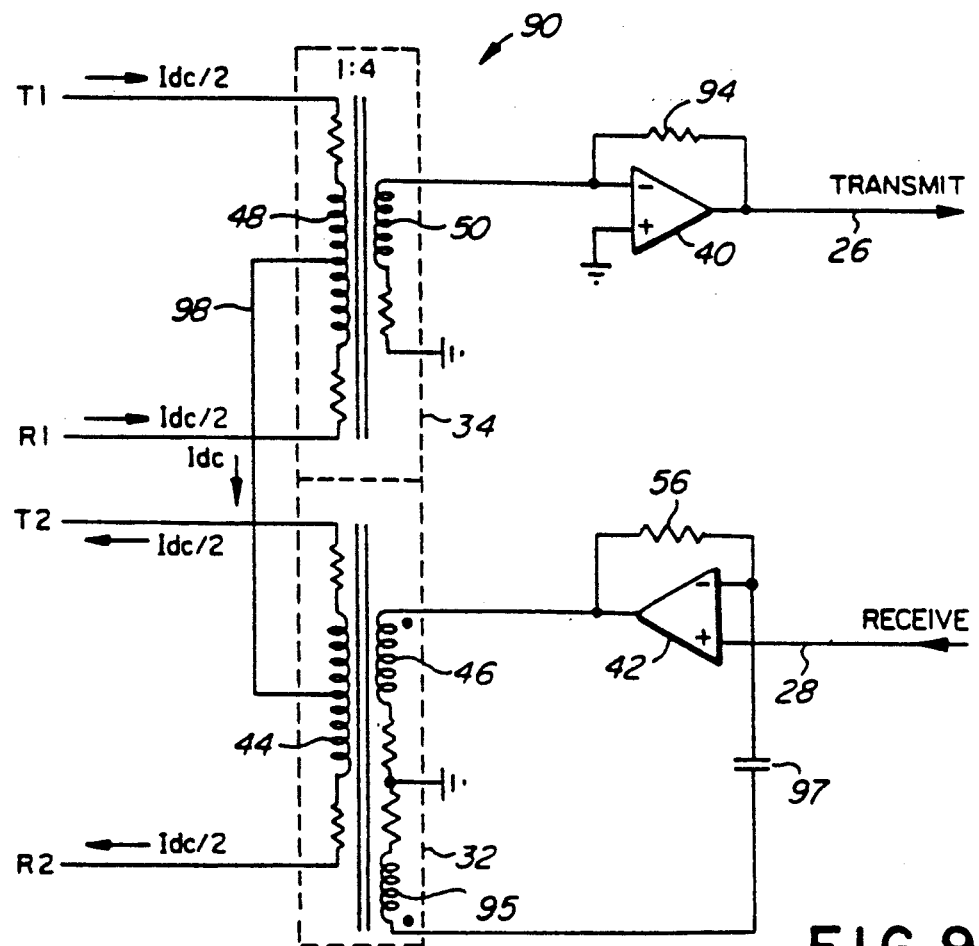

FIGS. 7 and 9 each have a feedback loop which is similar in configuration to that of FIG. 6 or FIG. 8 but the resistor 96 in FIGS. 6 and 8 is not needed. The operation of the feedback loop is the same in principal as described with reference to FIGS. 6 and 11 but it uses voltage feedback instead of current feedback.

The difference is based on the fact that the RECEIVE signal in FIGS. 7 and 9 is fed to the non-inverting input of amplifier 42. Thus, for the example of FIG. 7, $$VF = Vreceive$$
$$V(T-R) = nVF \text{ where } n \text{ is the turns ratio of winding 44 to winding 95}$$
$$= nVreceive$$

Thus, the transfer function for the FIGS. 7 and 9 configuration $$V(T-R)/Vreceive = n$$

Incidentally, FIG. 7, which is based on FIG. 2, has the balance resistor 38 connected to the feedback loop rather than the output of amplifier 42.

I claim:

1. An interface circuit for a two wire telecommunications line having a ring wire and a tip wire or for a four wire telecommunications line having first ring and tip wires defining a receive side and second ring and tip wires defining a transmit side, the interface circuit comprising a transformer having first, second and third windings, the first winding being arranged for connection across the ring and tip wires of the two wire telecommunications line or across the first ring and tip wires of the four wire telecommunications line, the second winding having one end connected to a reference potential and another end connected to the output of an operational amplifier which has an input connected to a receive line, the third winding having one end connected to a reference potential and another end connected in a feedback loop to an inverting input of the amplifier, whereby the transfer function of the interface circuit is dependent on the turns ratio of the first winding to the third winding but substantially independent of transformer parasitics.

2. An interface circuit according to claim 1 in which the first winding is a split winding with two equal halves interconnected by an impedance.

3. An interface circuit according to claim 1 in which the amplifier input to which the receive line is connected is the inverting input, a first resistor is connected in series between the receive line and the inverting input and a second resistor is connected in the feedback loop in series with the third winding, the transfer function of the interface circuit additionally being dependent on the ratio of the resistances of the first and second resistors.

4. An interface circuit according to claim 1 in which the amplifier input to which the receive line is connected is a non-inverting input.

5. An interface circuit according to claim 1 in which the feedback loop includes a blocking capacitor.

6. An interface circuit according to claim 1 in which the turns ratio of the first winding to the third winding is of the order of 10:1.

7. An interface circuit according to claim 2 in which the amplifier input to which the receive line is connected is the inverting input, a first resistor is connected in series between the receive line and the inverting input and a second resistor is connected in the feedback loop in series with the third winding, the transfer function of the interface circuit additionally being dependent on the ratio of the resistances of the first and second resistors.

8. An interface circuit according to claim 2 in which the amplifier input to which the receive line is connected is a non-inverting input.

9. An interface circuit according to claim 2 in which the feedback loop includes a blocking capacitor.

10. An interface circuit according to claim 3 in which the resistances of the first and second resistors are substantially equal.

11. An interface circuit according to claim 2 in which the turns ratio of the first winding to the third winding is of the order of 10:1.

12. An interface circuit according to claim 3 in which the turns ratio of the first winding to the third winding is of the order of 10:1.

13. An interface circuit for a two-wire telecommunications line, comprising: first and second transformers each having first and second windings and the first transformed having third winding, the first windings of the first and second transformers being coupled in series with each other for connection across the two wires of the two-wire telecommunications line; a receive path comprising an operational amplifier having an input coupled to a receive line and an output coupled to one end of the second winding of the first transformer and providing a low terminating impedance, another end of the second winding being connected to a reference potential; a transmit path for coupling the second winding of the second transformer to a transmit line; a balance impedance coupled between the transmit path and the receive path; wherein the receive path further comprises a feedback loop comprising the third winding which has one end connected to a reference potential and another end connected to an inverting input of the amplifier, whereby the transfer function of the interface circuit is dependent on the turns ratio of the first winding of the first transformer to the third winding of the first transformer but substantially independent of the first transformer parasitics.

14. An interface circuit according to claim 13 in which the amplifier input to which the receive line is connected is the inverting input, a first resistor is connected in series between the receive line and the inverting input and a second resistor is connected in the feedback loop in series with the third winding, the transfer function of the interface circuit additionally being dependent on the ratio of the resistances of the first and second resistors.

15. An interface circuit according to claim 13 in which the amplifier input to which the receive line is connected is a non-inverting input.

16. An interface circuit according to claim 13 in which the feedback loop includes a blocking capacitor.

17. An interface circuit according to claim 14 in which the resistances of the first and second resistors are substantially equal.

18. An interface circuit according to claim 13 in which the turns ratio of the first winding to the third winding is of the order of 10:1.

19. An interface circuit for a four-wire telecommunications line having first tip and ring wires defining a receive side and second tip and ring wires defining a transmit side, the interface circuit comprising: first and second transformers each having a center-tapped first winding and a second winding, and the first transformer having a third winding, the first winding of the first transformer being arranged for coupling to the first tip and ring wires and the first winding of the second transformer being arranged for coupling to the second tip and ring wires; connection means between the center taps of the first windings; a receive path comprising an operational amplifier having an input coupled to a receive line and an output coupled to one end of the second winding of the first transformer and providing a low impedance termination thereof, another end of the second winding of the first transformer being connected to a reference potential, the receive path supplying signals via the first transformer to the first tip and ring wires of the four-wire telecommunications line; and a transmit path for coupling the second winding of the second transformer to a transmit line for deriving signals via the second transformer from the second tip and ring wires of the four-wire telecommunications line, wherein the receive path further comprises a feedback loop comprising the third winding which has one end connected to a reference potential and another end connected to an inverting input of the amplifier, whereby the transfer function of the interface circuit is dependent on the turns ratio of the first winding of the first transformer to the third winding of the first transformer but substantially independent of the first transformer parasitics.

20. An interface circuit according to claim 19 in which the amplifier input to which the receive line is connected is the inverting input, a first resistor is connected in series between the receive line and the inverting input and a second resistor is connected in the feedback loop in series with the third winding, the transfer function of the interface circuit additionally being dependent on the ratio of the resistances of the first and second resistors.

21. An interface circuit according to claim 19 in which the amplifier input to which the receive line is connected is a non-inverting input.

22. An interface circuit according to claim 19 in which the feedback loop includes a blocking capacitor.

23. An interface circuit according to claim 20 in which the resistances of the first and second resistors are substantially equal.

24. An interface circuit according to claim 19 in which the turns ratio of the first winding to the third winding is of the order of 10:1.

* * * * *